(No Model.) 2 Sheets—Sheet 1.
C. MARCHAND & V. M. PICABIA.
MANUFACTURE OF ANHYDROUS CAUSTIC BARYTA.
No. 305,828. Patented Sept. 30, 1884.
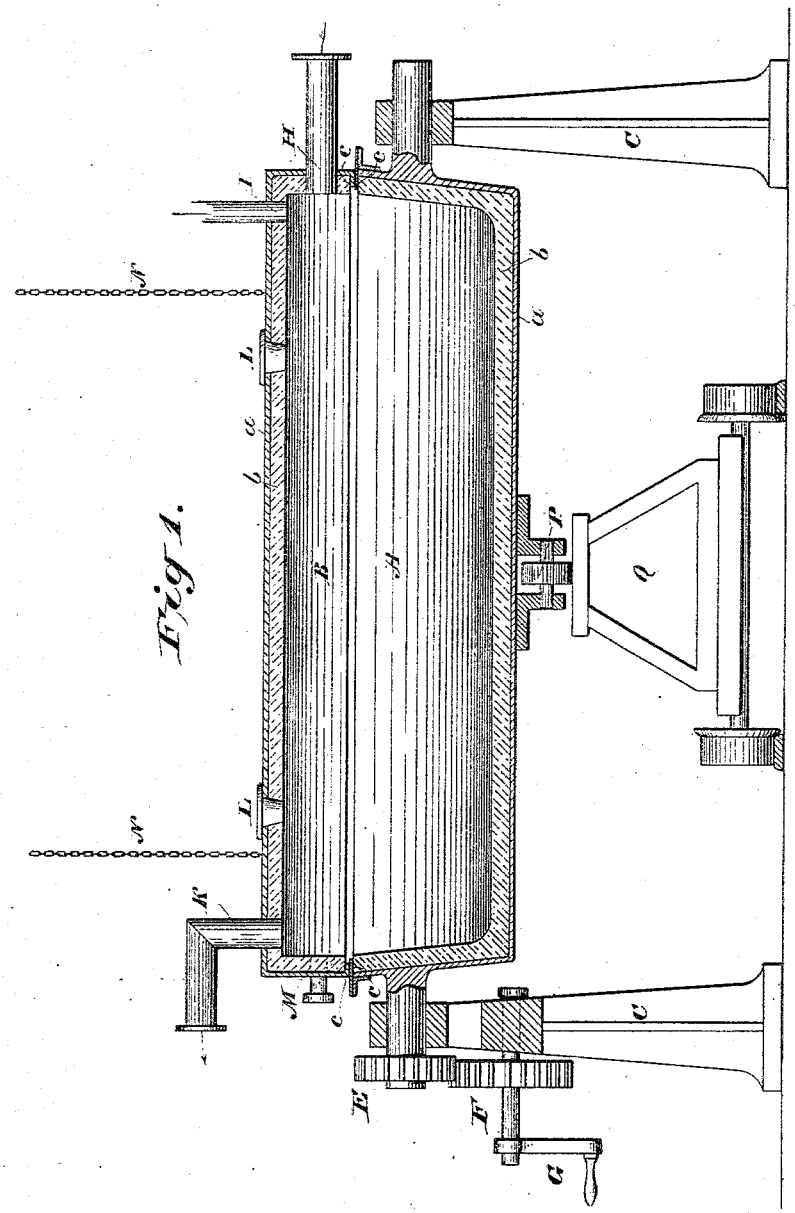

(No Model.) 2 Sheets—Sheet 2.
C. MARCHAND & V. M. PICABIA.
MANUFACTURE OF ANHYDROUS CAUSTIC BARYTA.
No. 305,828. Patented Sept. 30, 1884.
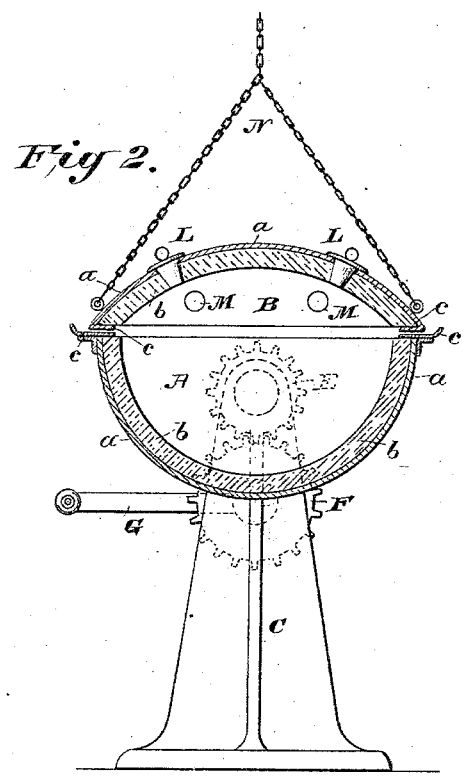
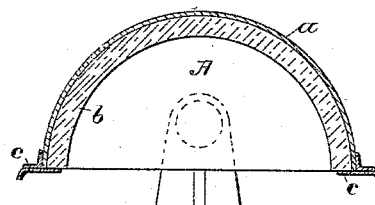
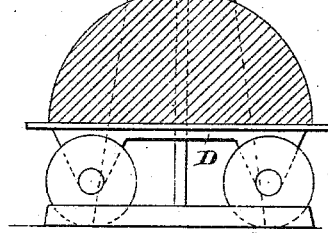

UNITED STATES PATENT OFFICE.

CHARLES MARCHAND AND VICENTE M. PICABIA, OF NEW YORK, N. Y.

MANUFACTURE OF ANHYDROUS CAUSTIC BARYTA.

SPECIFICATION forming part of Letters Patent No. 305,828, dated September 30, 1884.

Application filed April 20, 1883. (No model.)

*To all whom it may concern:*

Be it known that we, CHARLES MARCHAND, of New York city, in the county and State of New York, and VICENTE M. PICABIA, of said New York city, in the county and State of New York, have invented a new and useful Improvement in the Manufacture of Anhydrous Caustic Baryta, which improvement is fully set forth in following specification.

This invention has reference to a new method of obtaining anhydrous baryta (barium monoxide, BaO) by roasting or calcining barium nitrate, and also to a new apparatus which is or may be used in carrying out the said method. Heretofore the barium nitrate has been roasted or calcined in muffles or retorts heated externally to the proper temperature, or in crucibles heated upon the hearth of a reverberatory furnace, the crucibles being of any shape and of suitable material, or in crucibles heated in a proper furnace directly by coal. In the present invention the nitrate is exposed in a suitable close vessel to the action of gases heated to the required temperature, so as to effect the disassociation of the oxide of nitrogen from the baryta and to carry off the same. The nitrate of barium is preferably introduced into the vessel in several successive charges, and the retort or roasting vessel is heated preparatory to introducing the nitrate. The effect of the high temperature is to liquefy the baryta, and as the result of the operation large cakes of pure baryta may be obtained. Being obtained by the mere disassociation of the elements of the nitrate of barium, it is not contaminated with carbon or other reducing agents heretofore mixed with the carbonate and other salts of barium to assist in their decomposition. The hot decomposing gas may be air or other gas heated to the proper temperature outside the roasting-vessel and introduced into the same, or it may be the result of fuel (preferably gaseous fuel) introduced with air into the vessel and burned therein. The nitrous fumes and other gases or products of combustion are carried off and passed through a condenser for collecting the nitrous fumes. For convenience in emptying, the retort or roasting vessel is divided longitudinally, so that one part can be removed and replaced like a cover, and the body of the retort is supported on journals, so that it can be turned upside down to discharge the baryta therefrom. For convenience in receiving and carrying off the discharged baryta, the retort is suspended a sufficient distance from the ground to admit the running of a car or wagon under it. The inlet and exit pipes are preferably connected with the removable top part of the retort or roasting-vessel. The said vessel is made of a metal (iron or steel) enveloped with a lining of refractory material. When a large retort or roasting-vessel is used, it is provided with temporary supports for the middle part, which are removed before discharging.

In the accompanying drawings, Figure 1 is a longitudinal vertical section of apparatus constructed in accordance with the invention; Fig. 2 a cross-section, and Fig. 3 a cross-section showing the body of the retort or roasting vessel reversed.

The retort or roasting-vessel is divided horizontally, and comprises a semi-cylindrical lower part or body, A, and a segmental upper part or body, B, somewhat less than a semi-cylinder. Each part is composed of an envelope, *a*, of metal, (cast-iron, wrought-iron, or steel,) and a lining, *b*, of refractory material, and has a lip, *c*, for retaining the lining in place, the said lip being removable to allow removal or repair of the lining when desired. Any material or composition adapted to withstand a temperature of 1,300° centigrade, and the action of the nitrous fumes may be employed. During the calcining operation the joint is packed or luted with refractory cement—say, mixture of fire-clay and kaolin. The body A is journaled near the top of posts C, which raise it a sufficient distance from the floor to admit a carriage, D, running under it. As shown, the carriage runs upon rails; but this is not material. One of the journals is provided with a spur-gear, E, fixed thereon, which gear is engaged by a second gear, F, fixed on a short shaft journaled in the same post. A crank, G, is provided for turning the gears F E, to revolve the body A into the position shown in Fig. 3 when required. The upper part or cover, B, is provided at one end with a fuel-inlet, H, and an air-inlet, I, with an outlet, K, at the other end, and with openings L, for introducing the barium nitrate in the middle. At the same end with the outlet, or in any other suitable part of the cover, are suitably-protected peep-holes M, for permitting inspection of the interior of the retort or roasting vessel. Chains N, or other suitable devices, are connected with the part or cover B, so that it can be raised away from the body or lower part, A, or lowered into contact therewith. The pipes or flues connected with the inlets H I and outlet K are provided with flexible joints or connections, so that they do not interfere with the raising and lowering. On the bottom of the retort or roasting-vessel, in the middle thereof, is shown a roller, P, which rests upon the car or carriage Q, constituting a temporary support for the vessel between the posts C. As many of these rollers and supports may be used as found desirable.

The operation of making caustic baryta in accordance with the invention by means of the apparatus described is as follows: The upper part or cover, B, having been placed on the lower part or body, A, as shown in Figs. 1 and 2, and the joint between them closed, a stream of fuel (gaseous fuel from a generator or furnace) is introduced by the inlet H, and at the same time air, heated or not, as desired, is forced into the retort or roasting-vessel through the inlet I. The gas is lighted by means of a small fire of carbon previously started in the said retort or vessel, or by other suitable means. When the interior has been heated to a red heat, (say 1,000° centigrade,) the barium nitrate is charged through the openings L (usually from sixty pounds to one hundred pounds at a time) until the lower part of the retort or vessel is about two-thirds full. After each charge the openings L are stopped, and when the previous charge has been nearly reduced a new one is added. The fuel and air are introduced continuously, so that the nitrate of barium is subjected to the direct action of the hot gases and the temperature inside the retort is maintained without interruption. When the lower part of the retort or roasting vessel is two-thirds full, the temperature is rapidly raised to a bright red, (say 1,300° centigrade,) so as to remove in a few minutes (fifteen to thirty minutes) the last traces of nitrous vapor. In a comparatively short time from the beginning of the operation (say four hours for a charge of seven hundred to nine hundred pounds) all the nitrate will have been reduced to caustic baryta. The gases from the outlet K are passed through a condenser of any ordinary or suitable construction for recovering the nitrous vapors, and are then allowed to escape through a chimney. The draft through the retort or roasting-vessel may be created or assisted by blowers, or the chimney may be relied upon to produce it alone. When the barium nitrate is entirely reduced, the gases are shut off and the baryta is allowed to cool. When it is cool, the cover B is lifted, the temporary support Q is withdrawn, the body A is turned upside down, (see Fig. 3,) and the baryta is dumped onto the car or carriage D, or other receptacle placed beneath the retort or roasting-vessel. The body A is then turned right side up, the cover B is replaced and luted, the fuel and air are again admitted, and barium nitrate is introduced as before.

It is obvious that modifications may be made in details without departing from the spirit of the invention, and that portions of the invention may be used separately. For example, the retort or roasting-vessel could at first receive its full charge; but the gradual introduction is more advantageous, and is specially claimed.

Although the invention particularly relates to the calcination or roasting of barium nitrate for the production of baryta, it is obvious that other materials could be roasted in the manner and by the means explained.

Instead of burning gaseous fuel in the retort or roasting-vessel, air or other gases heated to the proper degree in a Siemens, Pousand, or other regenerator, or in other suitable apparatus, may be introduced through one or both of the inlets. This mode of heating, when the proper apparatus can be had, is even more advantageous than the direct combustion of the fuel in the retort or roasting-vessel. The shape of the said retort or vessel has been described as substantially a cylinder with its axis horizontal; but it may be spherical or semi-spherical, or a cylinder with its axis vertical, or it may be made with an annular space to receive the barium nitrate, a passage or chamber being left, if desired, in the center for the passage of the hot air or gases. Other shapes may be employed. The covers may be flat or arched. In all cases the retort or vessel is heated internally. The lower part or body of the retort is supported by journals, with or without the aid of one or more temporary supports under the bottom.

The object of the temporary supports is to prevent flexure of the envelope, which might otherwise take place at the high temperature used in the operation.

The special advantages of the above-described new method of obtaining anhydrous caustic baryta are as follows: When the calcination of nitrate of baryta is performed in retorts heated outside, it is impossible to reach safely the proper heat inside if the envelope of the retort is made of cast-iron, wrought-iron, or steel, because these metals would be nearly melted and promptly destroyed. Consequently, fire-clay retorts must be used exclusively, and since, during two-thirds of the operation, the nitrate of baryta is as liquid as water, the smallest porosity or crack in the retort would allow the material to pass through it. Then the retort is destroyed in a few minutes and its contents lost. Porcelain or platinum retorts could also be used for the purpose, but the caustic baryta produced sticks so hard to the porcelain or platinum that it is nearly impossible to discharge the baryta when warm or cooled, except by breaking up the retort. Another objection is that the porcelain retorts are subject to crack very easily when they cool quickly.

The discharging of the baryta when it is at the solid state after its production by turning over or reversing the lower body of the retort is a great improvement, and is one of the principal advantages of our invention.

According to the present invention the internal heat does not affect anything but the inside refractory lining, which can be repaired or changed when required without any trouble, and in case any crack should happen in that refractory lining during the operation the outside metallic envelope will prevent and stop any leakage of the melted nitrate of baryta. It will be easy to repair the lining after cooling, whereas the ordinary fire-clay or porcelain retorts, when cracked, cannot be repaired and become worthless. By our process, therefore, the cooling of the baryta after the operation is finished can be obtained quickly or slowly without trouble due to cracking of the fire clay or lining, the repair of cracks being easily accomplished.

The use of porcelain, fire-clay, or metallic crucibles heated on the hearth of a reverberatory furnace is so obviously different from the process herein described as to require no discussion. It may, however, be said that by this invention the retort, when it has been discharged, is ready immediately for a new operation, while with crucibles heated on the hearth of a reverberatory furnace the latter must be allowed to cool for many hours before receiving a new charge of crucibles.

We claim the new improvements herein described, to wit:

1. In the art of making caustic baryta from nitrate of barium, the improvement consisting in subjecting the nitrate of barium in a close vessel to the action of gases heated to a high temperature, so as to effect the disassociation of the oxide of nitrogen from the baryta, substantially as and for the purposes described.

2. In the art of making caustic baryta from nitrate of barium, the improvement consisting in subjecting the nitrate of barium to the direct action of gases heated to the described temperature, and thereby decomposing the nitrate and driving off the oxide of nitrogen and liquefying the baryta, and then, having allowed the baryta to solidify, dumping the cake or solidified material from the vessel in which the reaction has taken place, substantially as described.

3. The two-part retort or roasting vessel lined with refractory material, having one part mounted on trunnions, and the other combined with means for independently supporting the same, said vessel being provided with inlet and outlet for passing hot gases through it, substantially as described.

4. The retort or vessel for roasting and dumping, provided with inlet and outlet openings in the removable cover of said vessel, the body of the said vessel and the cover having both a refractory lining, substantially as described.

5. The combination, with the retort or vessel for internal roasting, composed of a metal envelope and refractory lining, and being mounted on trunnions, of the support for the middle of the said retort or vessel in roasting, the same being removable to permit of the contents being dumped, substantially as described.

In testimony whereof we have signed this specification in the presence of two subscribing witnesses.

C. MARCHAND.
V. M. PICABIA.

Witnesses:
J. B. NONES,
C. HOFMANN.